US006811858B1

(12) United States Patent
Mayer et al.

(10) Patent No.: US 6,811,858 B1
(45) Date of Patent: Nov. 2, 2004

(54) GRAVURE PROCESS FOR FULL PRINTING OF LARGE SURFACES

(75) Inventors: Karlheinz Mayer, Augsburg (DE); Reinhard Plaschka, Windach (DE); Johann Muller, Poing (DE); Peter Franz, Bruck (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/787,920

(22) PCT Filed: Sep. 29, 1999

(86) PCT No.: PCT/EP99/07217

§ 371 (c)(1), (2), (4) Date: Jun. 28, 2001

(87) PCT Pub. No.: WO00/20217

PCT Pub. Date: Apr. 13, 2000

(30) Foreign Application Priority Data

Oct. 2, 1998 (DE) ........................................ 198 45 440

(51) Int. Cl.[7] ................................................ B32B 3/00

(52) U.S. Cl. ................................ 428/195.1; 101/401.1; 428/156

(58) Field of Search ........................ 101/401.1; 428/156, 428/195.1

(56) References Cited

FOREIGN PATENT DOCUMENTS

| | | | |
|---|---|---|---|
| DE | GM 6601350 | | 3/1969 |
| GB | 2030929 | * | 4/1980 |
| JP | 08282195 | | 10/1996 |
| WO | WO 97/48555 | | 12/1997 |

* cited by examiner

*Primary Examiner*—Bruce H. Hess
(74) *Attorney, Agent, or Firm*—Bacon & Thomas, PLLC

(57) ABSTRACT

Printing plates for all-over printing of large areas by the intaglio printing process, a method for producing the printing plates and data carriers, in particular bank notes, with large-area printed images produced by the intaglio printing process are proposed. Flawless inking is ensured by providing partitions in the engraving of the printing plate which rise up vertically from the base of the engraved area and have at least a height of 50% of the engraving depth. The partitions largely prevent ink from being wiped out of the engraved areas when ink is wiped off the printing plate surface. This permits a large printed area to be covered all over with ink layers on a data carrier. By special arrangement and design of the partitions one can also produce fine structures in the printing area which are recognizable only with magnifying aids depending on the selected distances between the partitions.

12 Claims, 3 Drawing Sheets

GRAVURE PROCESS FOR FULL PRINTING OF LARGE SURFACES

Figure 1:
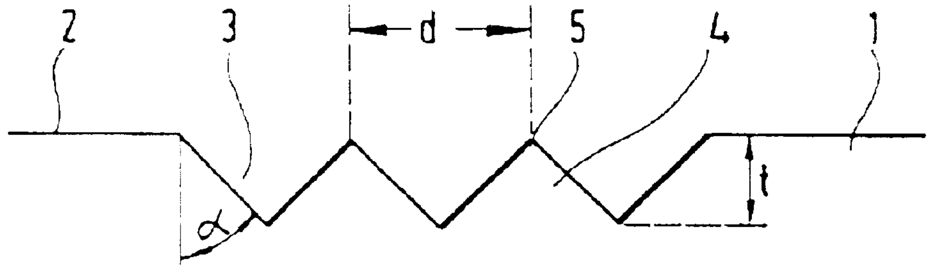

This invention relates to a printing plate for all-over printing of large areas by the intaglio printing process, to a method for producing the printing plate, and to a data carrier with a large-area printed image produced by the intaglio printing process.

In line intaglio, flat representations are known to be produced by closely adjacent engraved lines, the individual engraved lines normally being fractions of a millimeter wide and separated from each other by unengraved lands.

For the printing operation the engraved lines of the printing plate are filled with ink. Surplus ink is removed from the printing plate with the aid of a wiping cylinder or doctor blade such that the engraved lines are filled with ink up to the edge. The lands separating the engraved lines are cleaned in this operation at the same time.

During printing, finally, the data carrier to be printed, generally paper, is pressed onto the printing plate under high pressure by means of a pressure cylinder having an elastic surface. The data carrier is thereby pressed into the ink-filled engraved lines of the printing plate, thereby coming in contact with the ink. When the data carrier is detached it draws the ink out of the depressions of the engraved lines. The resulting printed image has printed lines which vary in ink layer thickness depending on the depth of the engraving.

If one uses translucent inks in line intaglio one obtains light tones when printing a white data carrier with low ink layer thicknesses, and darker tones when printing with thick ink layers.

In comparison with other common printing processes, the intaglio printing process can produce printed images with very great ink layer thicknesses. The resulting printed images are even perceptible manually if the engravings are deep enough. By using accordingly fine engravings, however, one can also obtain extremely fine and sharp printed lines.

Although the intaglio printing process can produce very high-quality printed images resolved into line structures, it has the disadvantage of not being able to produce large continuous printed areas, i.e. lines with a width of about one millimeter and more. This is because when the inked printing plate is wiped, not only the surplus ink is removed in the area of large-area engravings but also ink from the engraving. This lowers the ink surface below the surface level of the printing plate in said engraved areas. Since the paper pressed into the engraved areas of the printing plate does not reach the ink surface in all places, gaps arise in the printed image which render the print useless.

The problem of the present invention is therefore to provide measures which permit large-area printed image areas to be printed all over by the intaglio printing process so as to produce a uniform color effect for the viewer.

This problem is solved according to the invention by the features of the independent claims. Developments are to be found in the subclaims.

The invention starts out from the finding that one can prevent ink from being wiped out of the area of the engraving when the printing cylinder or plate is wiped by providing so-called separating lands or partitions in the engraving which prevent: or minimize the action of the wiping cylinder on the ink incorporated in the printing plate engraving. It is suspected that the wave of surplus ink pushed over the printing plate surface by the wiping cylinder during wiping draws parts of the ink out of the engraving as well by reason of hydrodynamic effects. The partitions apparently prevent ink in the engraving from being moved within the total volume and entrained with the wave of ink of the wiping cylinder. The partitions thus divide a large-area engraving into contiguous "chambers" or channels which permit ink to be taken out perpendicular to the printing plate surface during printing but not during wiping parallel to the printing plate surface.

The partitions are preferably disposed transversely to the direction of rotation of the printing cylinder. In this arrangement they apparently cause a shearing of the wave of ink during the wiping process and thus a hydrodynamic decoupling of ink in the engraving from the wiping process taking place on the printing plate surface.

In cases where it is not possible to arrange the partitions transversely to the wiping direction, the partitions at least effect a division of large-area engravings, giving them a similar function with respect to wiping out of ink as exists with fine-structured engravings.

Taking the basic inventive idea into account in optimized form, the engraved areas are preferably to be equipped with partitions transversely to the wiping direction. For engraved lines extending along the wiping direction this yields a division of the engraved lines into adjacent partial portions. The engravings extending transversely or diagonally to the wiping direction are divided at least in the longitudinal direction of the engraved line, the partitions preferably extending parallel to the engraving edges.

In cases where the engraving not only consists of very wide engraved lines but also contains large-area engraved elements having similar extensions in the x and y directions, it is also possible to execute the partitions as a screen, i.e. to provide intersecting partitions extending e.g. lengthwise and crosswise with respect to the wiping direction. It is also possible to provide partitions in the form of concentric circles in a honeycomb shape or the like. Such a formation of the partitions not only has the advantage of in any case guaranteeing the function of the partitions independently of the wiping direction, but also ensures that the partitions have increased mechanical stability.

Inventively providing partitions in the engraving of the intaglio printing plate already proves especially advantageous as of an engraved line width greater than 0.5 millimeters. For engraved lines with a width of one millimeter and more they prove to be almost imperative.

The height of the partitions can be varied within a relatively great span, as tests have shown. If the partitions end at the level of the printing plate surface one should make sure that the partition form, viewed in cross section, tapers in a wedge shape. This ensures that the engraving is divided into separate channels or chambers in the optimum form, on the one hand, while the sharp-edged partitions cause no interruption of the printing area on the other hand.

If one lowers the upper partition edges below the level of the printing plate surface, the cross-sectional form of the partitions can deviate from the wedge form almost at will, i.e. be trapezoid, rounded or a different shape. Since the upper partition edges are always disposed below the level of the printing plate surface in this case and thus always covered with ink, the production of a continuous printing area is ensured in any case.

It has turned out that when one uses partitions whose upper edges end exactly on the level of the printing plate surface the surface of the wiping cylinder wears out relatively quickly. Lowering the upper partition edge by at least 2 microns to 5 microns eliminates this problem. Such a minimum lowering is in any case recommendable for this reason.

Tests have furthermore shown that much greater lowering of the upper partition edges is also possible. A lowering of up to about 50% below the level of the printing plate surface, based on the engraving depth, is accordingly possible.

It has also turned out that if the partitions have a height (also referred to in the following as amplitude) based on the engraving depth of more than 50%, they cause "notches" in the ink layer surface on the thus produced printing area. Although the printing area produced with such a large-area engraving is printed continuously with ink, it thus has a surface relief caused by the partitions. The surface relief is especially pronounced if the partition amplitude is selected in the range of 75% to 100% of the engraving depth. At lower amplitudes, e.g. in the range of about 60% this surface relief becomes ever weaker, finally disappearing completely at an amplitude of about 50%. Below the value of 50% one must increasingly expect printing errors in the form of gaps or skips rendering the print useless, particularly with deeper engravings.

Tests have finally shown that engraving depths of 5 microns to about 150 microns are excellent to use according to the invention. The preferred engraving depth found for the production of common printed images was the range of 10 microns to 60 microns. Using customary intaglio printing inks, one thus obtains ink layers with a rather translucent color effect, and even slight changes in engraving depth lead to readily visible changes in tone. Engravings with a depth in the range of about 60 microns to 100 microns are particularly suitable for printing ink layers with a saturated, opaque color effect. The exact values of course vary depending on whether a light or dark color is involved.

Engravings with a depth of 100 microns and more are particularly suitable for producing ink layer structures with a relief readily perceptible to the touch.

The finer the fine structure of the printed area represented by the surface relief is, the less it appears when viewed without aids (magnifying glass). This applies at least to fine structures resulting from partitions with-a distance of about 20 microns to 150 microns and a wedge shape. Partitions with a distance of 150 microns to about 400 microns are already recognizable with the naked eye, but in no way disturb the flat general impression of the printed color area. If one uses a trapezoid cross-sectional profile instead of wedge-shaped partitions, the notches in the surface relief become wider, i.e. more real. Such structures permit a creative influence on the area to be printed since e.g. the screen formed by the partitions also appears as a layout element. If the partitions are not worked into the engraving like a screen but in the form of characters, graphic symbols or the like, these characters or graphic symbols are also recognizable in the printed area.

If one enlarges the partition distance clearly above 500 microns, the above-mentioned printing errors in the form of ink gaps, skips, spots or the like increasingly occur.

Considering that the production of intaglio printing plates is already one of the most elaborate methods for producing printing plates, it is easy to see that additionally providing partitions in the engraving raises considerable additional problems. This holds all the more since not only the form, amplitude and arrangement of the partitions ate necessary for the inventive function, but also a precision in the micron range. Such printing plates are not producible manually or by means of etching. The inventive prints and printing plates therefore ensure a high measure of protection against forgery and imitation.

However, such printing plates can be produced by an engraving apparatus from the applicant, as described in WO 97/48555. This apparatus makes it possible to mill intaglio printing plates by computer control. The lines of a two-dimensional linework are detected by a computer and the area of each individual line exactly defined. Using an engraving tool, e.g. a rotating chisel or laser beam, the outside contour of these areas is first engraved to cleanly border the area. Subsequently the bordered region of the area is cleared out using the same or another engraving tool so that the total line is exactly engraved according to the line original. Depending on the nature and control of the engraving tool one can produce both a certain roughness (instead of a smooth surface) on the base of the engraving, and the inventive partitions with any desired amplitude, different flank angles or precisely given cross-sectional forms. The important thing, as mentioned above, is that the partitions have a minimum amplitude of about 50% of the engraving depth for the inventive function. If this value is fallen clearly short of, ink adheres to the base of the engraving better than with a smooth engraving base, but the abovementioned printing errors are inevitable with large-area engraved elements.

The invention offers completely new possibilities of design for intaglio printing plates. By using engravings printing over large areas it is now possible to produce engraved lines with a width of 1 millimeter to 10 millimeters and more, with ink layer thicknesses of 40 microns and more. One can also realize continuous geometric areas with a size of a few square centimeters by intaglio printing without problem The fine structure of the printing area can be present both in the form of a screen and in the form of characters or graphic symbols. Even if the coarsest fine structure is selected (with a partition distance in the order of magnitude of 500 microns), it cannot be imitated with any known printing process, which considerably increases the forgery-proofness of accordingly printed data carriers. The fine structure thus proves not only the use of the intaglio printing process, which is already high-quality itself, but also the use of the engraving apparatus described in WO 97/48555, which is not available to any forger because of the high costs.

Further advantages will emerge from the description of the following embodiments.

FIGS. 1 to 7 each show details of a printing plate with an engraving in cross section.

FIG. 1 shows a detail of printing plate I whose surface 2 is provided with engraving 3 with given depth i serving to receive ink. The engravings shown in cross section extend linearly, perpendicular to the paper plane, and are formed so that there are partitions 4 between the parallel depressions, upper partition edges 5 being at the level of printing plate surface 2. Partitions 4 prevent ink from being wiped out of the depressions formed by engraving 3, on the one hand, and cause a structuring of the ink layer transferred to a substrate, on the other hand. The substrate is printed with ink over the complete area in the region of the engraving.

The offset at which parallel engravings 3 are produced corresponds to distance d of upper partition edges 5. In the case shown in FIGS. 1 to 3, where the offset of the engraving tool during engraving of depressions 3 corresponds to distance d of the upper partition edges, distance d is preferably in the range of 20 microns to 150 microns, a distance of about 50 microns being especially preferred for production of fine structures not recognizable without aids.

The modulation of the ink layer thickness produced by the partitions produces in the printed ink layer a fine structure which is not resolved by the naked eye under normal viewing and can therefore serve as a hidden security feature not reproducible either by electrophotography or by other printing processes.

Despite the fine structuring of the printed ink layer, a homogeneous color effect is produced for the human eye. The intensity of the color effect or perceived tone depends on the mean ink layer thickness, and can be adjusted by engraving depth t at given flank angle $\alpha$.

Figure 2:
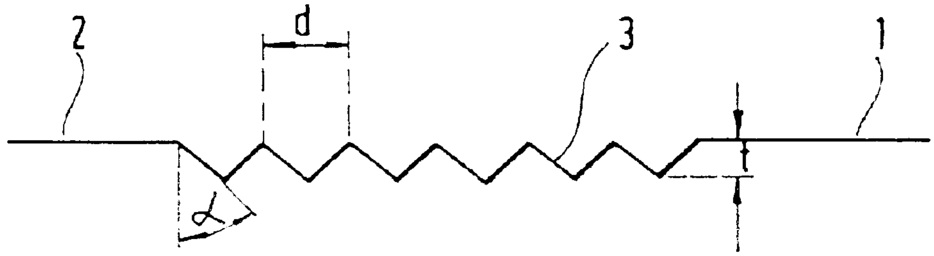

FIG. 2 shows a printing plate in cross section for printing a generally thinner ink layer which produces a lighter tone. The engraved areas of the printing plates shown in FIGS. 1 and 2 are equally large and engravings 3 have same flank angle $\alpha$. By reason of lower engraving depth t in FIG. 2 one selects lower distance d for the offset of the engraved lines. For printing contiguous color areas it is essential that engraving depth t and distance d of upper partition edges 5 are selected with consideration of flank angle $\alpha$ such that no flat plateaus arise at the level of printing plate surface 2 within an engraved area.

Figure 3:
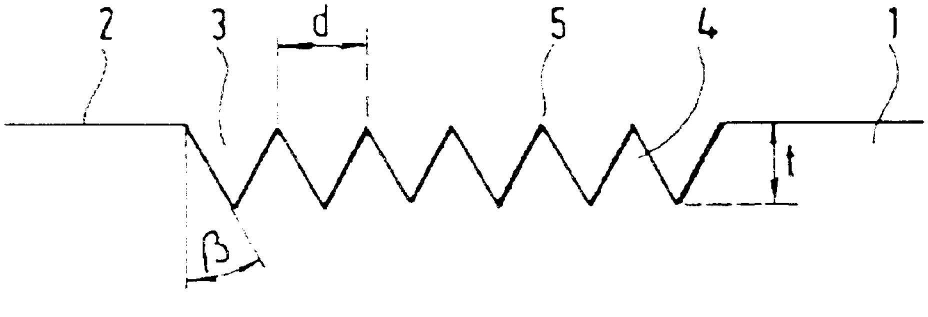

In FIG. 3 the engraved area has the same extension as in the examples of FIGS. 1 and 2. Engraving depth t is the same as in FIG. 1. Although partitions 4 have different flank angle $\beta$, an ink layer transferred with a printing plate according to FIG. 3 has the same mean layer thickness as one printed with a printing plate according to FIG. 1. Despite different distance d of partitions 5 and thus the different fine structure, areas with the same tone are printed with the printing plates of FIGS. 1 and 3.

However, the printing plates according to FIGS. 2 and 3 have same partition distance d and thus produce a fine structure with the same periodicity, but lead by reason of the different flank angles ($\alpha$,$\beta$) to ink layers with different mean thicknesses and different tones.

Engravings 3 are preferably produced with a rotating chisel whose point angle, measured from the center line of the chisel, corresponds to the flank angle of the engraving. The flank angles are preferably in the range of 15° to 60°, the particularly preferred range being 30° to 50°. Mechanical engraving tools have increased life in particular with the preferred point angles. Printing plates with the preferred flank angles can be duplicated more easily by molding techniques and furthermore have especially favorable printing properties. The preferred partition forms (cross sections) are wedge-shaped geometries. However, one can also use any other, in particular wavy or sinusoidal, geometries. The cross-sectional form of partitions 4 is restricted only by the possibilities of designing the contour of an engraving tool.

Figure 4:
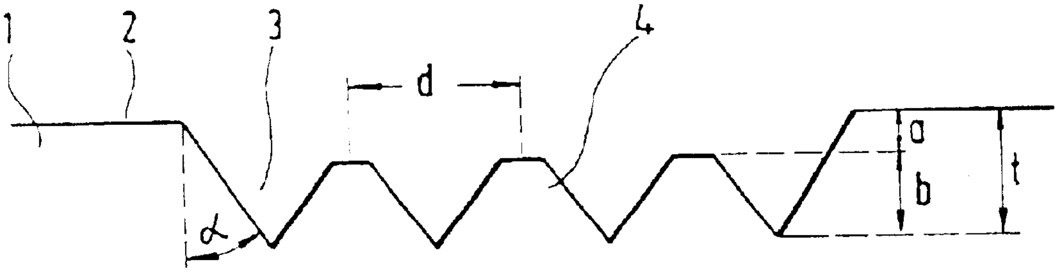
Figure 5:
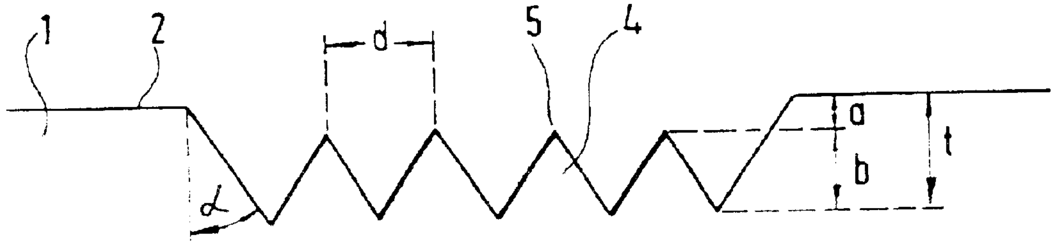

If the ink layer thickness in the transitional area from a fine-structure line to the adjacent one is to be reduced only to a nonzero value, it is suitable to use structures as shown in FIGS. 4 and 5.

An embossing plate according to FIG. 4 is produced by removing the outwardly pointing ends of the partitions after engraving the depressions forming the fine structure. Alternatively, one can first clear in depth a the total area to be provided with an engraving and then engrave the depressions forming the fine structure. This lowers the outwardly pointing ends of the partitions below the level of printing plate surface 2 by value $\alpha$. The remaining height of the partitions will be referred to as amplitude b in the following, and results from the difference of engraving depth t and partition lowering $\alpha$. A substrate printed with such a printing plate is provided over the complete area in the region of the engraving with an ink layer having thickness $\alpha$ and additionally modulated with a fine structure having maximum amplitude b. The upper partition ends formed as a plateau in this example produce fine light lines in the printed image. With corresponding guidance of the engraved lines producing partitions 4, the light lines produced in the printed image by trapezoid partitions 4 can render patterns, characters or graphic symbols.

According to the embodiment shown in FIG. 5 one can also obtain partition lowering a by selecting the offset between the individual engraved lines to be so small, at given flank angle $\alpha$ and given engraving depth t, that upper partition edge 5 is below the level of printing plate surface 2.

Partition lowering is advantageous because it prevents the plastic surface of the wiping cylinder from coming in direct contact with sharp-edged partitions 4, thereby reducing wear on both the wiping cylinder surface and the fine engraved structures of the printing plate. Partition lowering a is preferably 2 microns to 5 microns below the level of printing plate surface 2. To ensure a clean rendition of the engraving as a frame structure of the transferred ink layer, amplitude b should be more than 50% of engraving depth t.

Figure 6:
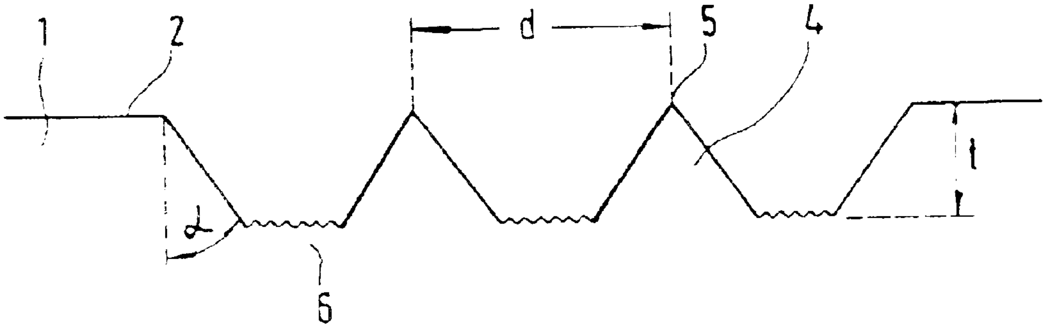
Figure 7A:
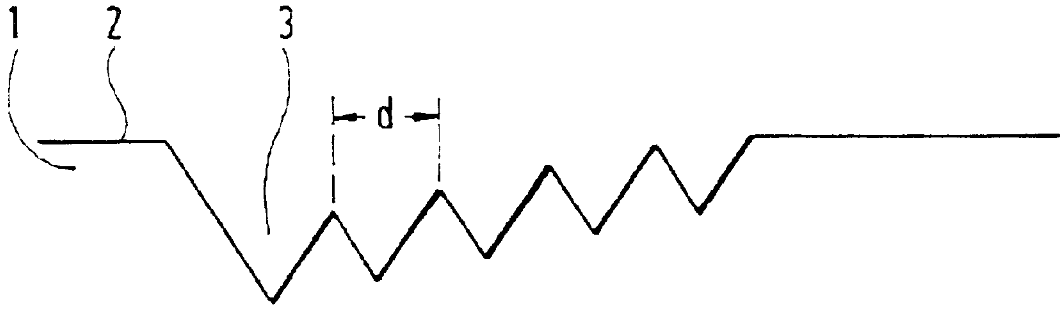
Figure 7B:
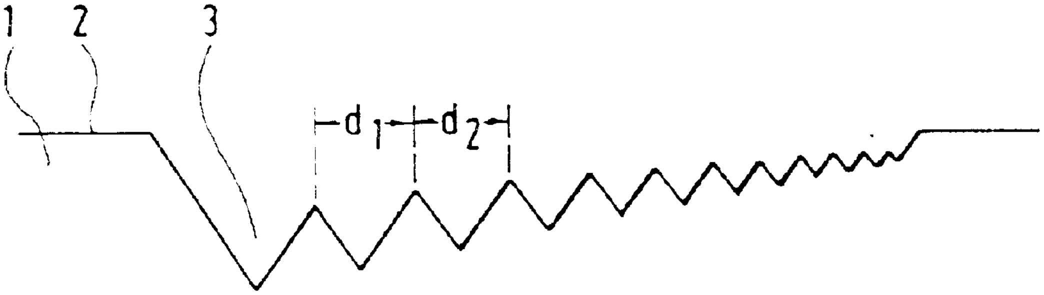

FIG. 6 shows a variant of the inventive engraving supplemented with partitions. In this embodiment, partitions 4 are disposed at greater distance d. In contrast to the embodiments of FIGS. 1 to 5, partition distance d does not correspond here to the offset of the engraving tool during engraving of the depressions. Distance d is preferably smaller than 500 microns. Horizontal bottom areas 6 of the engraving are provided between partitions 4, having a selectively adjusted surface roughness to improve ink adhesion. Surface roughness is adjusted by the selected geometry of the point angle and point radius of the engraving tool and by setting suitable values for the offset between two engraved lines transversely to the engraving direction. According to a preferred embodiment of the invention, engraving 3 is incorporated into printing plate surface 2 such that the engraving depth is nonconstant within the engraved area but increases or decreases continuously in one direction (FIGS. 7*a*, 7*b*). Variation of the engraving depth is preferably effected such that the deepest points of each engraved line are on an inclined plane relative to the printing plate surface. It is also possible to change the engraving depth such that the deepest points lying in a cross-sectional plane of the printing plate are on a curve whose course can be described for example by a parabola or hyperbole. By varying the engraving depth one can vary the perceived tone within a contiguous printed color area, in particular if the depth variation is effected between 5 microns and 60 microns.

In the embodiment according to FIG. 7*a* partition distance d and the height of the partitions are constant throughout the engraving, while in the variant according to FIG. 7*b* the distance and height of the partitions increase with engraving depth ($d_1 > d_2$).

It is possible to combine engravings of different kinds and designs and with different partition forms on one printing plate. One can also make areas with different types of engraving or partition forms adjoin each other, and perform corresponding variations within a self-contained engraved area. Further, one can superimpose a second engraving on a first one. If the first engraving is formed of parallel, preferably straight, engraved lines and the second engraving likewise of parallel preferably straight, engraved lines, one obtains a so-called cross-line screen. If the lines of the first and second engravings form with each other-an angle between 20° and 90°, in particular 40° to 70°, the resulting engraving has especially good ink adhesion, which has a favorable effect on the printing properties of an accordingly engraved printing plate. The ink layers printed therewith furthermore have an especially uniform tone.

The first engraving and superimposed second engraving can be produced with engraving tools of different geometries and with different engraving depths and/or different engraved line offsets. In the case of the preferred cross-line screen, this leads to periodically interrupted partitions.

What is claimed is:

1. A data carrier with a printed image produced by the intaglio printing process and comprising at least one printed image area having an ink layer and a surface area of more than one square millimeter, the at least one ink layer covering the complete printed image area, wherein the lateral dimensions such as length and width of the area are greater than 0.5 millimeters and the ink layer has along one direction at least one notch on which the ink layer thickness passes through a minimum.

2. The data carrier according to claim 1, wherein the lateral dimensions such as length and width of the area are greater than one millimeter.

3. The data carrier according to claim 1, including a surface relief of the at least one ink layer, the surface relief having a fine structure with regularly recurring structural elements.

4. The data carrier according to claim 3, wherein the structural elements recur at a distance smaller than 0.5 millimeters.

5. The data carrier according to claim 3, wherein the fine structure forms a screen or regular pattern.

6. The data carrier according to claim 5, wherein the screen is a line screen or cross-line screen.

7. The data carrier according to claim 5, wherein the fine structure forms a screen wherein the line width is less than 150 microns.

8. The data carrier according to claim 3, including at least a first printed image area with a first fine structure and a second printed image area with a second fine structure different from the first fine structure.

9. The data carrier according to claim 8, wherein the first and second printed image areas represent one or more characters or a picture.

10. The data carrier according to claim 8, wherein the fine structure of the first printed image area has a different orientation from the fine structure of the second printed image area.

11. The data carrier according to claim 8, wherein the fine structures of the first and the second printed image areas differ by different line widths.

12. The data carrier according to claim 8, wherein the first and second printed image areas differ by different ink layer thicknesses.

* * * * *